(12) United States Patent
Sipolins et al.

(10) Patent No.: US 10,915,740 B2
(45) Date of Patent: Feb. 9, 2021

(54) FACIAL MIRRORING IN VIRTUAL AND AUGMENTED REALITY

(71) Applicant: INTERNATIONAL BUSINESS MACHINES CORPORATION, Armonk, NY (US)

(72) Inventors: Aldis Sipolins, New York, NY (US); Jenna Reinen, Greenwich, CT (US); Hui Wu, White Plains, NY (US); Ravi Tejwani, White Plains, NY (US); Marco Cavallo, New York, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 177 days.

(21) Appl. No.: 16/048,230

(22) Filed: Jul. 28, 2018

(65) Prior Publication Data
US 2020/0034606 A1 Jan. 30, 2020

(51) Int. Cl.
G06K 9/00 (2006.01)
G06F 3/01 (2006.01)
G09B 19/00 (2006.01)
G06T 19/00 (2011.01)
G06N 20/00 (2019.01)

(52) U.S. Cl.
CPC ......... *G06K 9/00302* (2013.01); *G06F 3/015* (2013.01); *G06N 20/00* (2019.01); *G06T 19/006* (2013.01); *G09B 19/00* (2013.01)

(58) Field of Classification Search
None
See application file for complete search history.

(56) References Cited

U.S. PATENT DOCUMENTS

| 8,777,630 | B2 | 7/2014 | Duffy | |
|---|---|---|---|---|
| 9,886,866 | B2 | 2/2018 | Merzenich et al. | |
| 10,204,264 | B1 * | 2/2019 | Gallagher | H04N 21/44218 |
| 10,222,942 | B1 * | 3/2019 | Zeiler | G06F 40/30 |
| 2005/0010637 | A1 * | 1/2005 | Dempski | G06Q 10/10 709/204 |
| 2005/0223237 | A1 * | 10/2005 | Barletta | G06F 3/011 713/186 |
| 2011/0143728 | A1 * | 6/2011 | Holopainen | G06K 9/00308 455/414.1 |

(Continued)

OTHER PUBLICATIONS

Adams, A. et al., "Expression Training for Complex Emotions Using Facial Expressions and Head Movements", IEEE (2015); pp. 784-786.

(Continued)

*Primary Examiner* — Delomia L Gilliard
(74) *Attorney, Agent, or Firm* — Intelletek Law Group, PLLC; Gabriel Daniel, Esq.

(57) ABSTRACT

A facial expression feedback system for providing real-time feedback on how closely a user matches his or her facial expression to a target expression is presented. The facial expression feedback system receives sensor data captured by a set of sensors. The facial expression feedback system evaluates the captured sensor data to generate a set of confidence scores with respect to a target facial expression. The system presents the feedback by modifying a multimedia presentation based on the generated set of confidence scores.

18 Claims, 5 Drawing Sheets

(56) References Cited

U.S. PATENT DOCUMENTS

| | | | |
|---|---|---|---|
| 2012/0124456 A1* | 5/2012 | Perez | G06Q 30/02 |
| | | | 715/200 |
| 2012/0307033 A1* | 12/2012 | Sheik Said | G06F 3/005 |
| | | | 348/77 |
| 2014/0242560 A1* | 8/2014 | Movellan | G09B 19/00 |
| | | | 434/236 |
| 2014/0316881 A1 | 10/2014 | Movellan et al. | |
| 2015/0213110 A1* | 7/2015 | Araki | G06F 16/58 |
| | | | 707/654 |
| 2016/0042648 A1* | 2/2016 | Kothuri | G06F 3/015 |
| | | | 434/236 |
| 2016/0078279 A1* | 3/2016 | Pitre | G06K 9/00228 |
| | | | 382/118 |
| 2017/0098122 A1* | 4/2017 | el Kaliouby | G16H 50/30 |
| 2017/0290504 A1* | 10/2017 | Khaderi | A61B 3/0091 |
| 2019/0139430 A1* | 5/2019 | Ghatage | G09B 7/02 |
| 2019/0155386 A1* | 5/2019 | Tadi | G06F 3/015 |

OTHER PUBLICATIONS

Gay, V. et al., "Using Sensors and Facial Expression Recognition to Personalise Emotion Learning for Autistic Children"; Studies in Health Technology and Informatics (2013), vol. 189; pp. 71-6; University of Technology, Sydney, Australia.

Gordon, I. et al., "Training Facial Expression Production in Children on the Autism Spectrum"; J. Autism Dev. Disord. (2014); vol. 44; pp. 2486-2498.

Harrold, N. et al., "CopyMe: an Emotional Development Game for Children"; ACM (2014), Toronto, Canada; 4 pgs.

Tsangouri, C. et al., "An Interactive Facial-Expression Training Platform for Individuals with Autism Spectrum Disorder", IEEE (2016); 4 pgs.

* cited by examiner

FACIAL MIRRORING IN VIRTUAL AND AUGMENTED REALITY

BACKGROUND

Technical Field

The present disclosure generally relates to computing devices, and more particularly, to computing devices that perform facial recognition.

Description of the Related Art

Facial recognition is a biometric software application capable of uniquely identifying or verifying a person by comparing and analyzing patterns based on the person's facial contours. Facial recognition is mostly used for security purposes, though there is increasing interest in other areas of use, such as law enforcement, education, medicine, entertainment, as well as other enterprises.

SUMMARY

Some embodiments of the disclosure provide a facial expression feedback system for capturing facial expression using sensor data and providing real-time feedback on how closely a user matches his or her facial expression to a target expression. The sensor data used for facial recognition may include electromyography (EMG) data, optical data, audio data, or a combination of different types of sensor data. In some embodiments, the facial expression feedback system evaluates the captured sensor data to generate a set of confidence scores with respect to a target facial expression. The system presents the feedback by modifying a multimedia presentation based on the generated set of confidence scores. Examples of the multimedia presentation can be a video game, a virtual reality (VR) presentation, an augmented reality (AR) presentation, or another form of visual/audio presentation.

The preceding Summary is intended to serve as a brief introduction to some embodiments of the disclosure. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a Summary, Detailed Description and the Drawings are provided. Moreover, the claimed subject matter is not to be limited by the illustrative details in the Summary, Detailed Description, and the Drawings, but rather is to be defined by the appended claims, because the claimed subject matter can be embodied in other specific forms without departing from the spirit of the subject matter.

BRIEF DESCRIPTION OF THE DRAWINGS

The drawings are of illustrative embodiments. They do not illustrate all embodiments. Other embodiments may be used in addition or instead. Details that may be apparent or unnecessary may be omitted to save space or for more effective illustration. Some embodiments may be practiced with additional components or steps and/or without all of the components or steps that are illustrated. When the same numeral appears in different drawings, it refers to the same or like components or steps.

DETAILED DESCRIPTION

In the following detailed description, numerous specific details are set forth by way of examples in order to provide a thorough understanding of the relevant teachings. However, it should be apparent that the present teachings may be practiced without such details. In other instances, well-known methods, procedures, components, and/or circuitry have been described at a relatively high-level, without detail, in order to avoid unnecessarily obscuring aspects of the present teachings.

People with Autism Spectrum Disorder (ASD) have difficulty displaying facial expressions and identifying facial expressions of others. Teaching facial mirroring has proven difficult because giving accurate real-time feedback is difficult with a human instructor operating alone.

Some embodiments of the disclosure provide a facial expression feedback system for capturing facial expression using sensor data and providing real-time feedback on how closely a user matches his or her facial expression to a target expression. The sensor data used for facial recognition may include electromyography (EMG) data, optical data, audio data, or a combination of different types of sensor data. In some embodiments, the facial expression feedback system evaluates the captured sensor data to generate a set of confidence scores with respect to a target facial expression. The system presents the feedback by modifying a multimedia presentation based on the generated set of confidence scores. Examples of the multimedia presentation can be a video game, a virtual reality (VR) presentation, an augmented reality (AR) presentation, or another form of visual/audio presentation.

Figure 1:
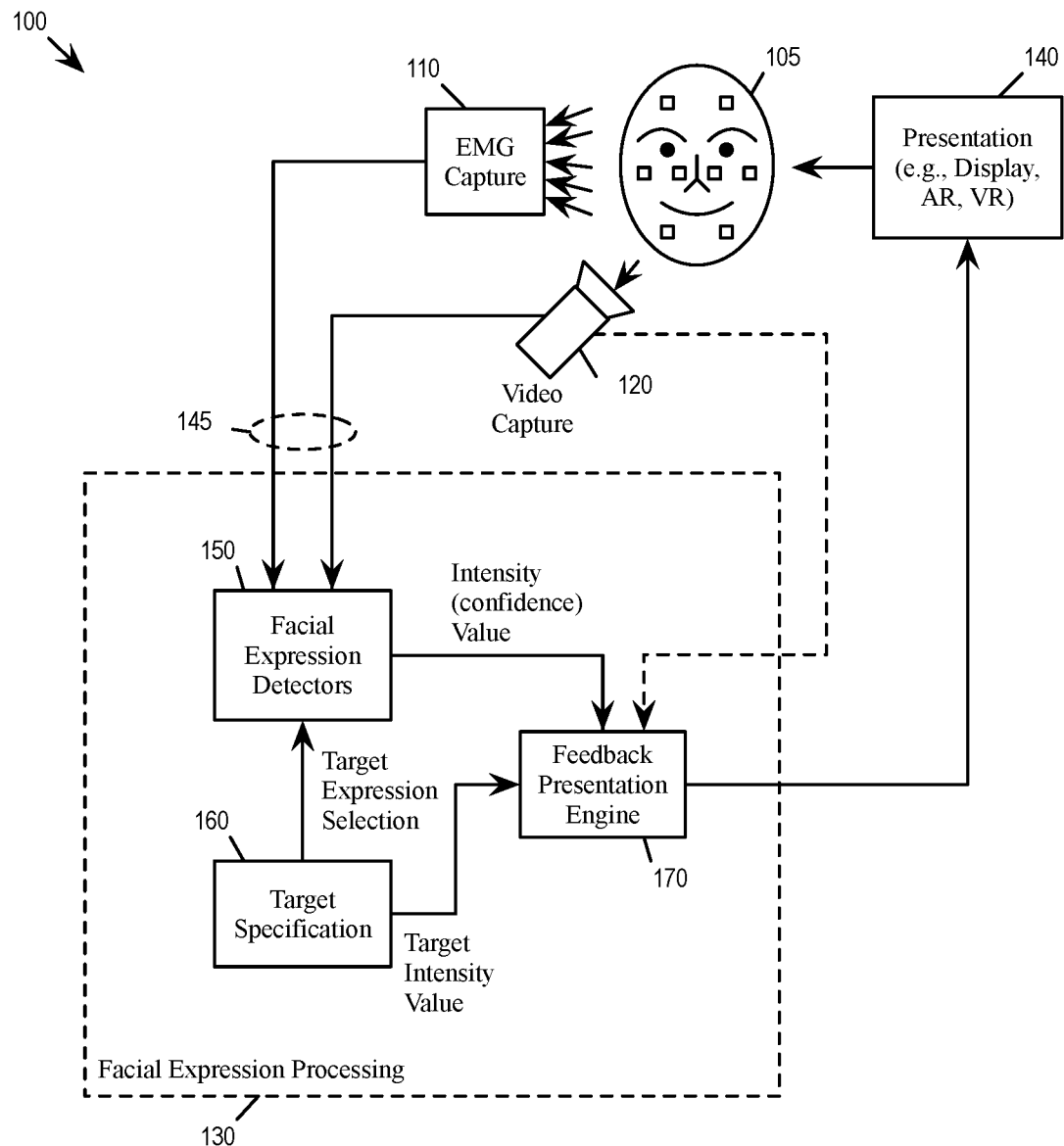
FIG. 1 conceptually illustrates a facial expression feedback system, consistent with an exemplary embodiment.

FIG. 1 conceptually illustrates a facial expression feedback system 100, consistent with an exemplary embodiment. The facial expression feedback system receives captured sensor data based on the facial expression of a user 105 and provides feedback regarding how closely the user's facial expression resembles a target facial expression. As illustrated, the feedback system 100 includes an EMG capture device 110, a video capture device 120, a facial expression processing device 130, and a feedback presentation device 140.

The EMG capture device 110, the video capture device 120, the facial expression processing device 130, and the feedback presentation device 140 may be individual electronic devices that are interconnected by communications mediums such as cables, wires, wireless signals, or networks. The devices 110-140 may also be components of the same electronic apparatus. An example computing device 500 that may implement the facial expression system 100 will be described by reference to FIG. 5 below.

The feedback system 100 may have one or more sensors for capturing the facial expression of the user 105. In the example illustrated in FIG. 1, the EMG capture device 110 records the electrical activity produced by skeletal muscles of the user 105 through electrodes attached the face of the user. The video capture device 120 includes a camera for capturing the video of the user's facial expression. The video capture device may also include a microphone for capturing any sound or voice that the user may make. The EMG data captured by the EMG captured device 110 and the video data captured by the video capture device 120 are provided as captured sensor data 145 to the facial expression processing device 140. Though not illustrated, the feedback system 100 may include other types of sensors for capturing other movements or sounds made by the user. The captured sensor data 145 captures the facial expression of the user 105 (among other things) such that the facial expression manifested in the captured sensor data can be referred to as the captured facial expression (of the user 105).

The feedback system 100 processes the captured sensor data 145 at the facial expression processing device 130. The facial expression processing device 130 receives the captured sensor data and evaluates the captured sensor data with respect to a target facial expression. The evaluation generates a score or a set of scores that quantify how closely the user's facial expression (as manifested in the captured sensor data) resembles the target facial expression. The generated score or set of scores is then used to generate a feedback presentation for the user. In some embodiments, the sensor data is captured and processed in real-time to generate real-time feedback for the user 105. This creates a feedback loop that allows the user to continually adjust his or her facial expression to more closely match the desired expression.

As illustrated, the facial expression processing device 130 includes a set of facial expression detectors 150, a target specification module 160, and a feedback presentation engine 170. In some embodiments, the modules 150-170 are modules of software instructions being executed by one or more processing units (e.g., a processor) of a computing device. In some embodiments, the modules 150-170 are modules of hardware circuits implemented by one or more integrated circuits (ICs) of an electronic apparatus. An example computing device that may implement the facial expression processing device 130 will be described by reference to FIG. 5 below.

The feedback system 100 provides the generated feedback presentation at the feedback presentation device 140. The feedback presentation device 140 may be one display or a set of displays, a VR goggle, or any other type of presentation device. The feedback presentation can be in the form of a video game, a 360-degree VR presentation, an AR presentation that mixes computer generated graphics with real life images, or another form of visual/audio presentation. The feedback presentation may include one or more visual objects and/or audio objects.

Figure 2:
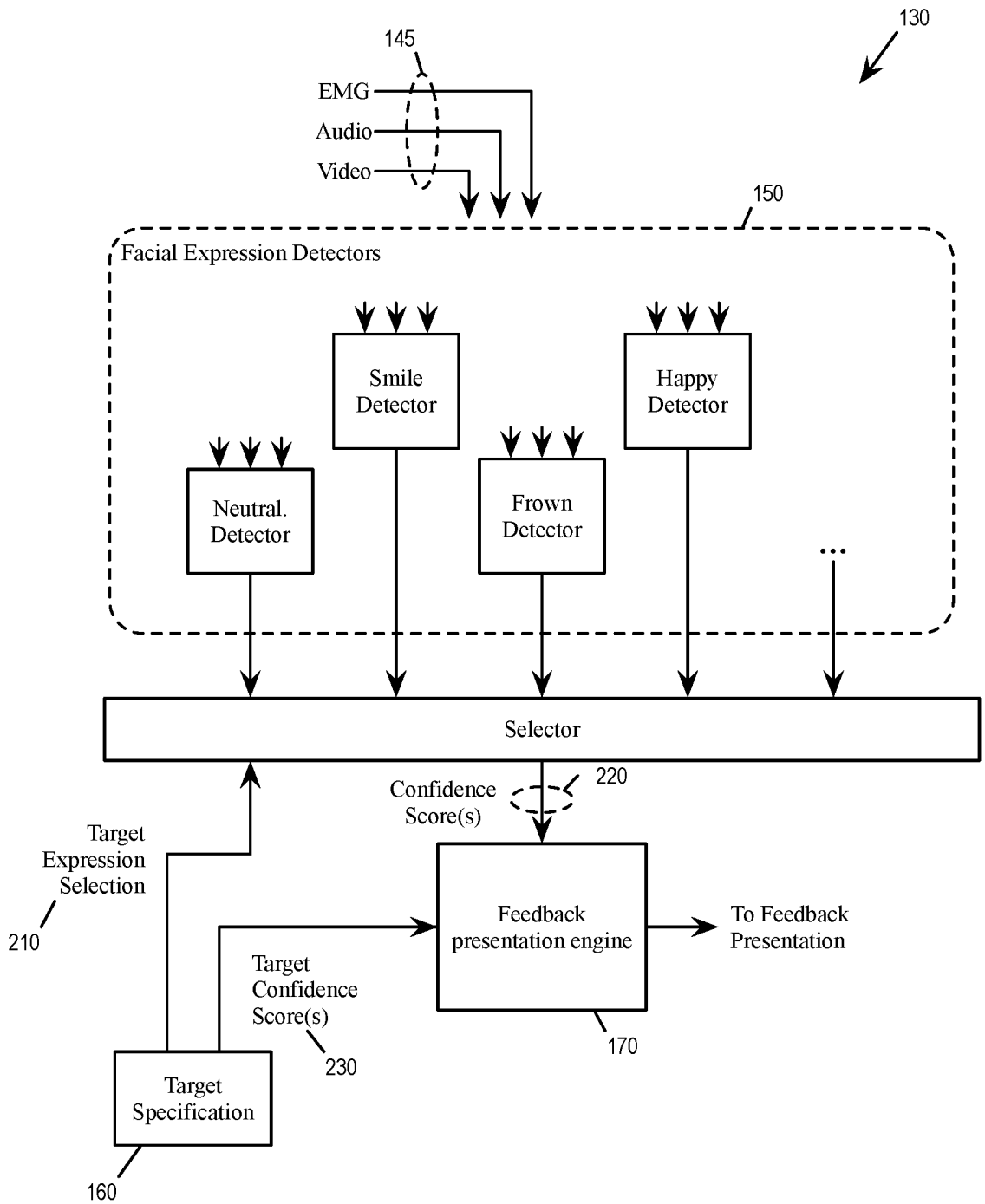
FIG. 2 illustrates the facial expression processing device in greater detail, consistent with an exemplary embodiment.

FIG. 2 illustrates the facial expression processing device 130 in greater detail, consistent with an exemplary embodiment. As illustrated, the facial expression processing device 130 includes multiple facial expression detectors 150 for different types of facial expressions (neutral, smile, frown, happy, sad, frightened, excited, etc.). Each detector of a particular facial expression receives the captured sensor data 145 and produces a set of confidence scores quantifying the resemblance of the captured facial expression to the particular facial expression.

In some embodiments, the detectors 150 perform a 2-step process that (i) identifies which facial expression the user is showing based on the captured sensor data and (ii) extracts features from the captured sensor data to determine a set of intensity or confidence scores of the identified facial expression. In some embodiments, each of the detectors 150 is a model that is trained by machine learning to recognize a particular type of facial expression based on one or multiple types of sensor data. Such a machine learning model can be trained by using time-stamped sensor data (e.g., EMG data, camera footage, or both) with emotional labels. Training data can be manually coded (e.g., by human watching video playback and labeling expressions) or acquired with emotionally-coded visual stimuli (e.g., a jump scare in a horror video would be labelled as eliciting a frightened expression).

The target specification module 160 specifies a target facial expression 210 so that the facial expression processing device 130 knows which of the facial expression detectors 150 to apply for determining the confidence scores from the captured sensor data. One or more facial expression detectors are selected by target facial expression selection 210, and the outputs of the selected detectors are collected as confidence scores 220 and passed to the feedback presentation engine 170. The target specification module 160 may provide a set of corresponding target confidence scores 230 for comparison with the confidence scores 220.

In some embodiments, the target specification module 160 categorizes the captured facial expression of the user into one of the possible facial expressions that the feedback system 100 is configured to detect. The facial expression that the captured facial expression is categorized into is then set to be the target facial expression. For example, the target specification module 160 may automatically select the target facial expression based on which of the trained facial expression detectors 150 outputs the highest scores for the captured facial expression.

In some embodiments, the target specification module 160 receives the specification for the target expression directly from a user through a user interface. An instructor may set the target facial expression according to a lesson plan so the student may learn to match his or her own facial expression to the target facial expression.

The feedback presentation engine 170 receives the confidence score 220 (i.e., the confidence score of the selected facial expression detector) and the corresponding target confidence score 230. The feedback presentation engine 170 determines the difference between the captured facial expression and the target expression by computing the difference between the received scores 220 and 230. This difference quantifies the discrepancy between the captured facial expression of the user 105 and the target facial expression.

In some embodiments, the feedback presentation engine 170 is a multimedia presentation engine that controls various visual or audible objects of a multimedia presentation. The feedback presentation engine 170 presents the discrepancy between the target facial expression and the captured facial expression by modifying the multimedia presentation. Specifically, the feedback presentation engine 170 modifies an existing object in the multimedia presentation by a quantity that is determined based on the confidence scores 160.

Modifying the multimedia presentation based on the confidence scores 220 may include using the difference between the confidence score 220 and the corresponding target confidence score 230 to compute a discrepancy value by which the feedback presentation engine 170 modifies an existing video element or audio element in the multimedia presentation. For example, the feedback presentation engine 170 may modify an existing visual element by changing its size, position, movement, color, saturation, or brightness according to the discrepancy value. The feedback presentation engine 170 may also modify an audio element in by modifying its pitch or loudness according to the discrepancy value. In some embodiments, the feedback presentation engine 170 interact with a video game engine to modify the game play based on the set of confidence scores 220.

The multimedia presentation can be in the form of an augmented reality (AR) that includes a real-time image of a face, e.g., a real-time display of the captured facial expression of the user 105. The modification to the multimedia presentation can include overlaying or superimposing one or more visual markers on the real-time image of the face. Such visual markers may include arrows or highlights over features or areas of the face to give specific feedback (e.g., upward arrow telling user to raise cheeks more).

Figure 3:
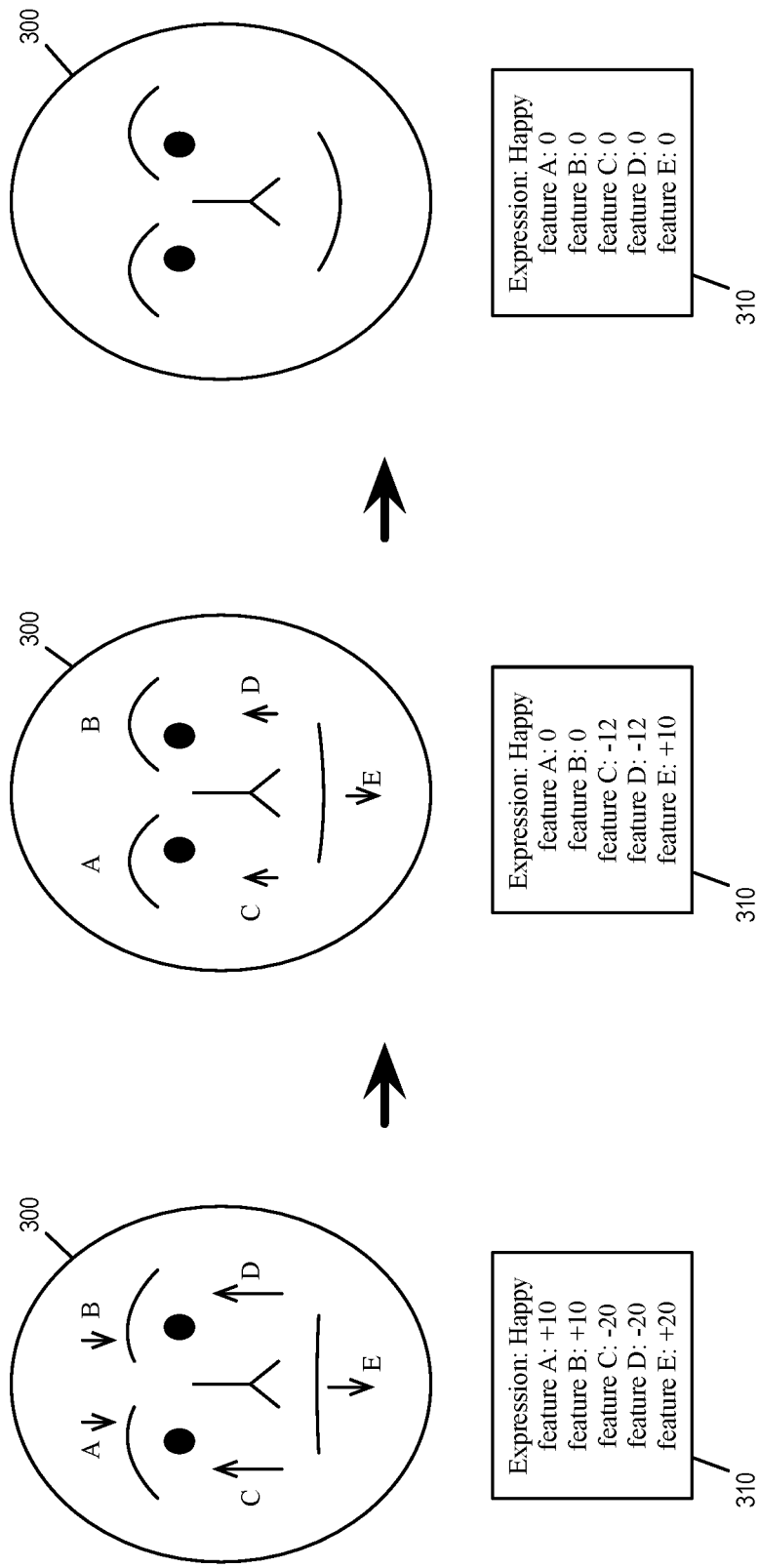
FIGS. 3a-c conceptually illustrate an example AR presentation generated by the facial expression feedback system.

FIGS. 3a-c conceptually illustrate an example AR presentation 300 generated by the facial expression feedback system 100 (at the feedback presentation engine 170), in which visual markers superimposed over a real-time image of the user's face are used to give specific feedback. The figure shows the AR presentation at three different time instances. In each of the time instances, the real-time image of the user is shown in the AR presentation, and visual markers (arrows) are shown to provide feedback to the user regarding how to change his or her facial expression. In the example, the target facial expression is set to "happy".

FIG. 3a conceptually shows the AR presentation at a first time instance before the user has adjusted his facial expression. The feedback system 100 generated a set of quantities 310 based on confidence scores that are derived from evaluation of real-time sensor data with respect to "happy" as the target facial expression. The set of quantities 310 correspond to different regions or features of the face. These features are labeled as A, B, C, D, E, which correspond to left eyebrow, right eyebrow, left cheek, right cheek, and lower lip (left/right defined from the perspective of the viewer since the image of the face is a mirror image), respectively. As illustrated, the quantity "+10" for the feature A corresponds to a downward arrow above the left eyebrow, while the quantity "−20" for the feature D corresponds to a upward arrow at the right cheek.

FIG. 3b shows the feedback system 100 updating the quantities A, B, C, D, and E based on the real-time sensor data captured near a second time instance. The newest real-time captured sensor data reflects the user changing his facial expression based on the feedback presentation. The visual markers in the AR presentation are correspondingly modified. As illustrated, the quantity 'A' has been updated to "0", which corresponds to disappearance of the arrow above the left eyebrow. The quantity 'D' has been updated to "−12", which corresponds to a reduction in size of the arrow at the right cheek.

FIG. 3c shows the feedback system 100 further updating the quantities A, B, C, D, and E based on further real-time update of the captured sensor data, which reflect further changes in the facial expression of the user near a third time instance. As illustrated, the quantities A, B, C, D, and E are all nearly zero. The feedback system 100 correspondingly modifies the AR presentation 300 so that the arrows disappear, indicating that the user has successfully changed his facial expression to match the target facial expression.

Figure 4:
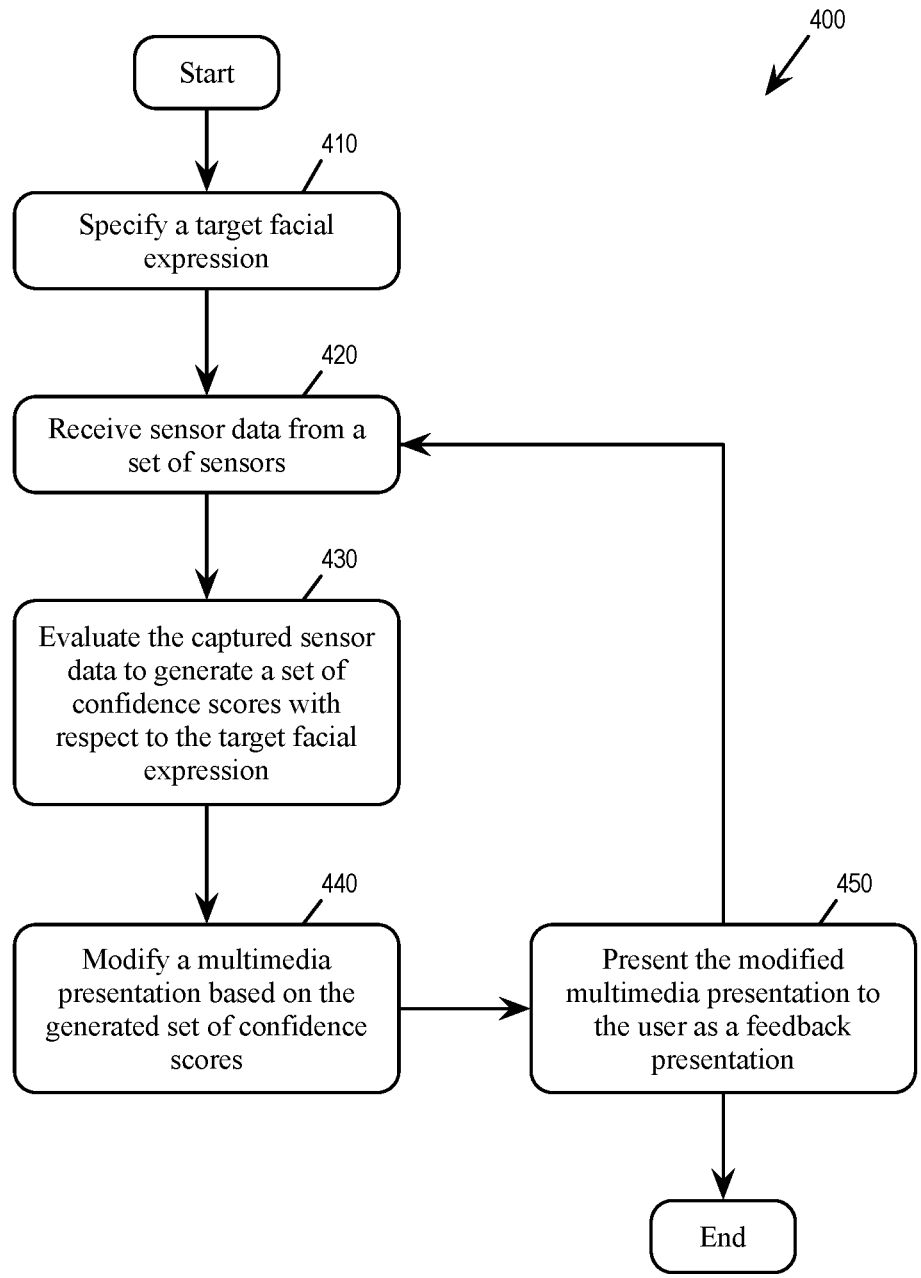
FIG. 4 conceptually illustrates a process for providing facial expression feedback, consistent with an exemplary embodiment.

FIG. 4 conceptually illustrates a process 400 for providing facial expression feedback, consistent with an exemplary embodiment. In some embodiments, one or more processing units (e.g., processor) of a computing device implementing the facial expression processing device 130 of the facial expression feedback system 100 performs the process 400 by executing instructions stored in a computer readable medium.

The process 400 starts when the feedback system specifies (at 410) a target facial expression. An instructor of a student using the facial expression feedback system may set the target facial expression so the student may learn to match his or her own facial expression with the selected target facial expression. The feedback system may also specify the target facial expression by categorizing the captured facial expression of the user.

The feedback system receives (at 420) sensor data captured from a set of sensors. The sensor data may include video data, audio data, and EMG data that are captured based on the facial expression of the user. The facial expression of the user is therefore captured in the received sensor data.

The feedback system evaluates (at 430) the captured sensor data to generate a set of confidence scores with respect to the target facial expression. The feedback system may apply one or more detectors that are configured to detect the target facial expression to generate the set of confidence scores from the captured sensor data.

The feedback system then modifies (at 440) a multimedia presentation based on the set of confidence scores. The feedback system controls various visual or audible objects of the multimedia presentation. Existing objects in the multimedia presentation may be modified by quantities that are determined based on the set of confidence scores. The modification quantities may be calculated to track the discrepancy between the captured facial expression and the target facial expression. The modification quantities may be calculated as the differences between the set of confidence scores and a corresponding set of target confidence scores. The feedback system 100 may modify the visual appearance of an existing element in the multimedia presentation by changing its size, position, movement, color, saturation, or brightness, etc. The feedback system 100 may also modify an audio element in the multimedia presentation by modifying the pitch or loudness of audio signals. The feedback system 100 may also interact with a video game engine to modify elements of the game play.

The feedback system presents (at 450) the modified multimedia presentation to the user as a feedback presentation so the user may learn to match his or her own facial expression with the selected target facial expression. The process 400 may end or return to 420 to continuously receive sensor data and update the feedback presentation.

By analyzing real-time sensor data of the facial expression of the user, the facial expression feedback system 100 is able to provide a real-time feedback to the user regarding his or her facial expression in an easy-to-understand feedback presentation, enabling the user to adjust his or her own facial expression to match a target facial expression in real-time.

The present application may be a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions. These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks. The flowchart and block diagrams in the Figures (e.g., FIG. 4) illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function (s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 5:
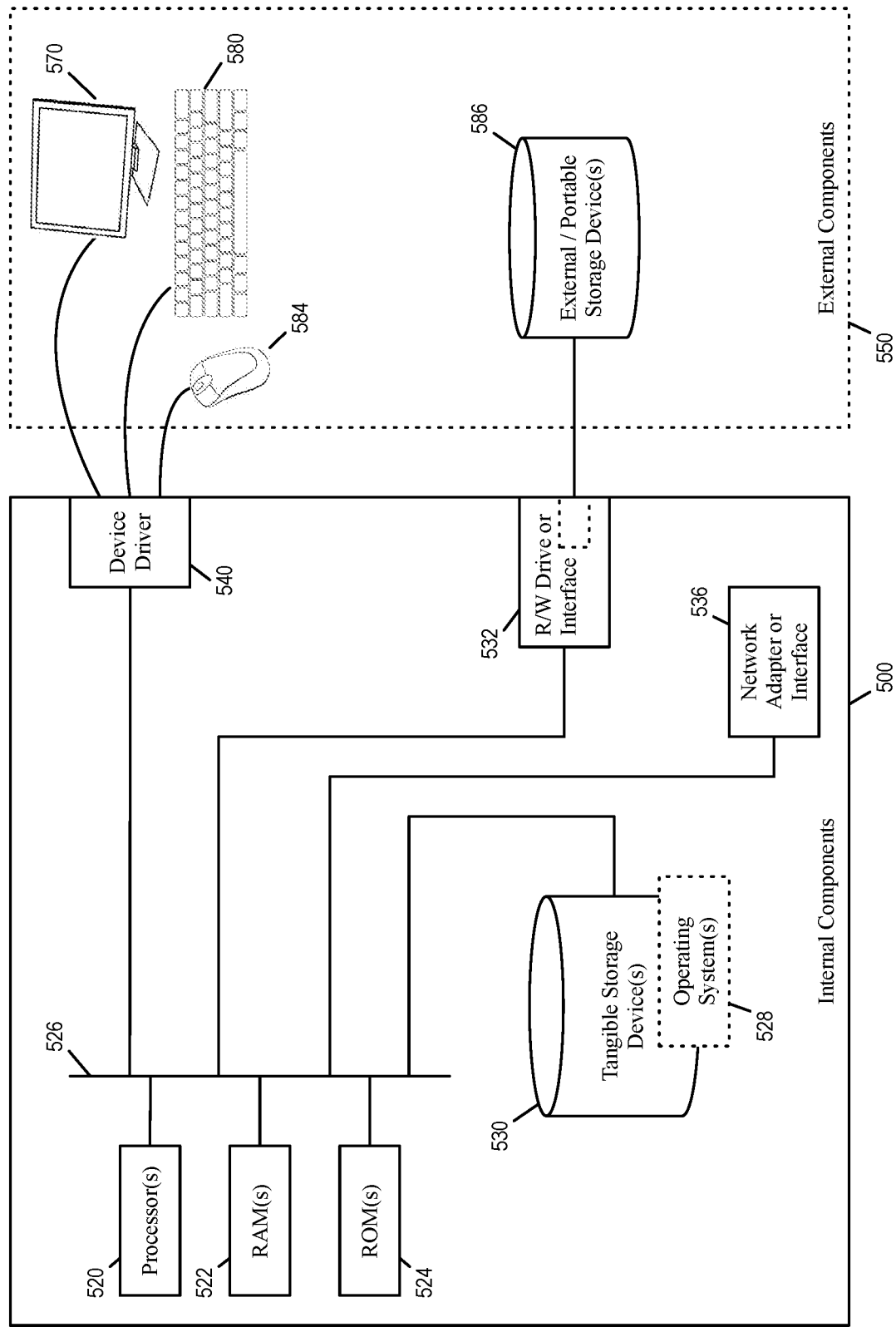
FIG. 5 shows a block diagram of the components of a data processing system in accordance with an illustrative embodiment of the present disclosure.

FIG. 5 shows a block diagram of the components of data processing systems 500 and 550 that may be used to implement the facial expression feedback system 100 or the facial expression process device 130 in accordance with an illustrative embodiment of the present disclosure. It should be appreciated that FIG. 5 provides only an illustration of one implementation and does not imply any limitations with regard to the environments in which different embodiments may be implemented. Many modifications to the depicted environments may be made based on design and implementation requirements.

Data processing systems 500 and 550 are representative of any electronic device capable of executing machine-readable program instructions. Data processing systems 500 and 550 may be representative of a smart phone, a computer system, PDA, or other electronic devices. Examples of computing systems, environments, and/or configurations that may represented by data processing systems 500 and 550 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

The data processing systems 500 and 550 may include a set of internal components 500 and a set of external components 550 illustrated in FIG. 5. The set of internal components 500 includes one or more processors 520, one or more computer-readable RAMs 522 and one or more computer-readable ROMs 524 on one or more buses 526, and one or more operating systems 528 and one or more computer-readable tangible storage devices 530. The one or more operating systems 528 and programs such as the programs for executing the process 400 are stored on one or more computer-readable tangible storage devices 530 for execution by one or more processors 520 via one or more RAMs 522 (which typically include cache memory). In the embodiment illustrated in FIG. 5, each of the computer-readable tangible storage devices 530 is a magnetic disk storage device of an internal hard drive. Alternatively, each of the computer-readable tangible storage devices 530 is a semiconductor storage device such as ROM 524, EPROM, flash memory or any other computer-readable tangible storage device that can store a computer program and digital information.

The set of internal components 500 also includes a R/W drive or interface 532 to read from and write to one or more portable computer-readable tangible storage devices 586 such as a CD-ROM, DVD, memory stick, magnetic tape, magnetic disk, optical disk or semiconductor storage device. The instructions for executing the process 400 can be stored on one or more of the respective portable computer-readable tangible storage devices 586, read via the respective R/W drive or interface 532 and loaded into the respective hard drive 530.

The set of internal components 500 may also include network adapters (or switch port cards) or interfaces 536 such as a TCP/IP adapter cards, wireless Wi-Fi interface cards, or 3G or 4G wireless interface cards or other wired or wireless communication links. Instructions of processes or programs described above can be downloaded from an external computer (e.g., server) via a network (for example, the Internet, a local area network or other, wide area network) and respective network adapters or interfaces 536. From the network adapters (or switch port adaptors) or interfaces 536, the instructions and data of the described programs or processes are loaded into the respective hard drive 530. The network may comprise copper wires, optical fibers, wireless transmission, routers, firewalls, switches, gateway computers and/or edge servers.

The set of external components 550 can include a computer display monitor 570, a keyboard 580, and a computer mouse 584. The set of external components 550 can also include touch screens, virtual keyboards, touch pads, pointing devices, and other human interface devices. The set of internal components 500 also includes device drivers 540 to interface to computer display monitor 570, keyboard 580 and computer mouse 584. The device drivers 540, R/W drive or interface 532 and network adapter or interface 536 comprise hardware and software (stored in storage device 530 and/or ROM 524).

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computing device comprising:
a processor; and
a storage device storing a set of instructions, wherein an execution of the set of instructions by the processor configures the computing device to perform acts comprising:
receiving sensor data captured by a set of sensors, comrpising electromyography (EMG) data, optical data, and audio data;
evaluating the captured sensor data comprising the EMG, optical, and audio data to generate a set of confidence scores with respect to a target facial expression; and
modifying a multimedia presentation based on the generated set of confidence scores.

2. The computing device of claim 1, wherein the execution of the set of instructions further configures the computing device to perform an act, comprising: receiving a selection of the target facial expression from a plurality of different facial expressions.

3. The computing device of claim 1, wherein generating the set of confidence scores comprises determining a set of discrepancies between the target facial expression and a captured facial expression based on the captured sensor data.

4. The computing device of claim 1, wherein:
generating the set of confidence scores comprises applying a model to the captured sensor data, and
the model is trained by machine learning to recognize the target facial expression.

5. The computing device of claim 1, wherein modifying the multimedia presentation based on the generated set of confidence scores comprises modifying an existing object in a multimedia presentation by a quantity based on the set of confidence scores.

6. The computing device of claim 1, wherein modifying the multimedia presentation comprises displaying a visual marker that points to a feature of a real-time image of a face in an augmented reality (AR).

7. The computing device of claim 1, wherein modifying the multimedia presentation comprises modifying an existing element in a multimedia game.

8. A computer program product comprising:
one or more non-transitory computer-readable storage devices and program instructions stored on at least one of the one or more non-transitory storage devices, the program instructions executable by a processor, the program instructions comprising sets of instructions for:
receiving sensor data captured by a set of sensors, comprising electromyography (EMG) data, optical data, and audio data;
evaluating the captured sensor data copmrising the EMG, optical, and audio data to generate a set of confidence scores with respect to a target facial expression; and
modifying a multimedia presentation based on the generated set of confidence scores.

9. The computer program product of claim 8, wherein:
generating the set of confidence scores comprises applying a model to the captured sensor data, and the model is trained by machine learning to recognize the target facial expression.

10. The computer program product of claim 8, wherein modifying the multimedia presentation based on the generated set of confidence scores comprises modifying an existing object in a multimedia presentation by a quantity based on the set of confidence scores.

11. The computer program product of claim 8, wherein modifying the multimedia presentation comprises displaying a visual marker that points to a feature of a real-time image of a face in an augmented reality (AR).

12. A computer-implemented method comprising:
receiving sensor data captured by a set of sensors, comprising electromyogaphy (EMG) data, optical data, and audio data;
evaluating the captured sensor data comprising the EMG, optical and audio data to generate a set of confidence scores with respect to a target facial expression; and
modifying a multimedia presentation based on the generated set of confidence scores.

13. The computer-implemented method of claim 12, further comprising receiving a selection of the target facial expression from a plurality of different facial expressions.

14. The computer-implemented method of claim 12, wherein generating the set of confidence scores comprises determining a set of discrepancies between the target facial expression and a captured facial expression based on the captured sensor data.

15. The computer-implemented method of claim 12, wherein:
generating the set of confidence scores comprises applying a model to the captured sensor data, and
the model is trained by machine learning to recognize the target facial expression.

16. The computer-implemented method of claim 12, wherein modifying the multimedia presentation based on the generated set of confidence scores comprises modifying an existing object in a multimedia presentation by a quantity based on the set of confidence scores.

17. The computer-implemented method of claim 12, wherein modifying the multimedia presentation comprises displaying a visual marker that points to a feature of a real-time image of a face in an augmented reality (AR).

18. The computer-implemented method of claim 12, wherein modifying the multimedia presentation comprises modifying an existing element in a multimedia game.

* * * * *